United States Patent [19]
Kleinschmit et al.

[11] Patent Number: 6,027,129
[45] Date of Patent: Feb. 22, 2000

[54] DEVICE FOR ADJUSTING MOTOR VEHICLE TOE-IN

[75] Inventors: Einhard Kleinschmit, Esslingen; Harald Reimold, Eppingen; Peter Tattermusch, Esslingen, all of Germany

[73] Assignee: DaimlerChrysler AG, Germany

[21] Appl. No.: 09/083,979

[22] Filed: May 26, 1998

[30] Foreign Application Priority Data

May 24, 1997 [DE] Germany .................... 197 21 752

[51] Int. Cl.⁷ .................................................. B62D 17/00
[52] U.S. Cl. ............................ 280/86.754; 280/86.758
[58] Field of Search ...................... 280/86.751, 86.752, 280/86.753, 86.754, 86.755, 86.756, 86.757, 86.758

[56] References Cited

U.S. PATENT DOCUMENTS

| | | | |
|---|---|---|---|
| 3,960,388 | 6/1976 | Strader et al. ............ | 280/86.754 |
| 4,695,073 | 9/1987 | Pettibone et al. .......... | 280/690 |
| 4,718,691 | 1/1988 | Specktor et al. .......... | 280/86.753 |
| 5,031,928 | 7/1991 | Tsubota et al. ........... | 280/86.754 |
| 5,052,711 | 10/1991 | Pirkey et al. ............ | 280/86.753 |

FOREIGN PATENT DOCUMENTS

| | | |
|---|---|---|
| 0 306 046 A2 | 3/1989 | European Pat. Off. . |
| 31 31 107 A1 | 12/1982 | Germany . |
| 32 00 879 A1 | 3/1983 | Germany . |
| 41 15 110 A1 | 11/1991 | Germany . |
| 44 37 661 A1 | 4/1996 | Germany . |
| 6-055340 | 10/1995 | Japan . |
| 6-282368 | 6/1996 | Japan . |

*Primary Examiner*—Kenneth R. Rice
*Attorney, Agent, or Firm*—Evenson, McKeown, Edwards & Lenahan P.L.L.C.

[57] ABSTRACT

A device is configured to set the toe-in of wheels of motor vehicles, especially in the case of unsteered axles of motor vehicles. Both the toe-in and the tilt of the toe-in curve are adjustable. Adjusting disks can be fixed with respect to supporting surfaces of the support arms in two positions apart. A kingbolt with associated guides in the adjusting disks assume different elevations with respect to an approximately horizontal reference plane containing the rotational axis.

10 Claims, 2 Drawing Sheets

DEVICE FOR ADJUSTING MOTOR VEHICLE TOE-IN

BACKGROUND OF THE INVENTION

This application claims the priority of German application 197 21 752.4-21, filed in Germany on May 24, 1997, the disclosure of which is expressly incorporated by reference herein.

The present invention relates to a device for adjusting the toe-in of wheels of motor vehicles, and more particularly to a device for setting the toe-in of wheels of motor vehicles with a bearing eye of a wheel suspension link lying between support arms on the body side, and guiding the bearing eye with respect to the supporting arm, which is adjustable vertically and horizontally for setting the toe-in established for a spring position of the vehicle corresponding to a design position by adjusting disks which in turn are guided on supporting surfaces of the support arm.

The toe-in of an axle is characterized by the so-called "basic toe-in," the toe-in set at an established deflection of the vehicle springs and the tilt or the tilt of the toe-in curve in space over the spring travel. During manufacture, the toe-in is adjusted, and during the life of the vehicle it is routinely checked in service inspections, because even slight deviations have a profound effect on performance, especially on tire wear.

In order to make toe-in corrections it is known to make the bearing position on the body side of a wheel suspension link adjustable by having the suspension link bearing held by a kingbolt between supporting arms on the body side provided with slots running in the direction of the width of the vehicle for the kingbolt, so that the kingbolt can be set at different positions across the vehicle. This positioning is performed by cams which can rotate with the kingbolt, i.e. which are co-rotational with the kingbolt and are held between contact surfaces of the supporting arms which are spaced apart from one another in the adjusting direction, namely transversely of the vehicle. As soon as the position necessary for the desired toe-in is reached, the cams are set with respect to the supporting arms.

In one known system described in DE 4115110 A1, proof is provided that the toe-in maintenance was performed in the first inspection by placing additional adjusting disks between the cam and the supporting arms. The disks have a bore to accommodate the kingbolt and a projection on the supporting arm end which fits into the slot guiding the supporting arm. The adjusting disks thereby invariably define a position of the kingbolt with respect to the supporting arms. For the first inspection it is prescribed that these adjusting disks be removed, so that a readjustment has to be performed with the cams. The adjusting disks when removed serve as proof that the maintenance has been done.

In another known device for setting the toe-in as shown in DE 3200879 A1, the supporting arms of a control arm mounting on the body side are provided with recesses into which the position-centered adjusting disks can be placed. Bores therein accommodate the kingbolt of the control arm mounting. Different settings of the kingbolt, and thus also different toe-in settings, can be carried out by keeping adjusting disks on hand with different bore patterns, or two different settings, can be defined through the particular adjusting disk if the latter is turned 180°. In the latter, the bore pattern assumed to be is not symmetrical with the particular axis of rotation.

Instead of fixing the adjusting disk by positioning it correctly in a recess in the supporting arm, provision is also made in the known device for providing the adjusting disk on its side facing the supporting arm with a projection which can be fitted into the kingbolt opening in the supporting arm which is oversized for the kingbolt, so that the result is thus a positioned mounting of the adjusting disk plus the desired positioning of the kingbolt in accord with the arrangement of the bore pattern for the kingbolt in the adjusting disk.

In these known systems, when adjusting the toe-in, only the preset toe-in, i.e., the toe-in with respect to an established spring position is changed, but the tilt of the toe-in curve in space remains fundamentally unaffected. To vary the tilt of the toe-in curve, methods independent of these above-described known methods have been applied, and the tilt of the toe-in curve is changed by making the elastic control arm bearings in the connection between the kingbolt and the suspension link adjustable such that the core and the outer sleeve of the suspension link are off-center from one another and rotatable. This signifies additional manufacturing expense and additional bearing variants.

Furthermore, a device for setting the toe-in and the tilt of the toe-in curve is described in DE 31 31 107 A1, in which the kingbolt carrying the bearing eye is adjustable, with respect to its supporting arms, by two eccentric systems independent of one another. Guides running transversely with respect to the vehicle are associated with the eccentrics of the one system and guides running vertically with respect to the vehicle are associated with the eccentrics of the other eccentric system. These guides lie with the corresponding adjusting disks on different sides of the supporting arms. An adjustment both transversely, i.e., the toe-in setting, and vertically, i.e., the toe-in tilt, is possible although at considerable cost, inasmuch as the arrangement of adjusting disks on both sides of the support arms plus the access necessary for their adjustment calls for an appropriate amount of space.

SUMMARY OF THE INVENTION

An object of the present invention is to provide a device in which the toe-in and tilt of the toe-in curve can be varied in a single procedure at little additional cost.

This object has been achieved in accordance with the present invention by providing that adjusting disks can be fixed with respect to the supporting surfaces of the support arms in two positions 180° apart, in which the kingbolt with the guides associated with it in the adjusting disks assume different elevations with respect to an approximately horizontal plane of reference containing an axis of rotation.

The configuration can be made such that, with an adjusting disk in one position the kingbolt axis lies in the reference plane, and is shifted out of this plane only when it is in the other position, or such that in both positions the same amount of space is obtained, but with opposite signs.

The foregoing is achieved in a simple and effective manner by the fact that the adjusting disks have projections on their sides facing the supporting arms, reach into the supporting arm and are supported on guiding margins of the supporting arm. Such a configuration results in cost, because the supporting arms for the adjustable kingbolts must anyway have kingbolt openings that are large, and larger than the kingbolt size, and the projections thus enter into these kingbolt openings and can be fitted therein.

In connection with guiding holes in the form of slots running transversely of the vehicle, different kingbolt positions can be achieved by the adjusting disks, both regarding toe-in and regarding the tilt of the toe-in curve. It is also desirable to associate with the adjusting disk, on its flat side confronting the projections, guiding abutments for eccentric adjusting disks, so that the need for corresponding guiding means on the supporting arms is eliminated thereby reducing the cost of the overall construction.

DETAILED DESCRIPTION OF THE DRAWINGS

Figure 1:
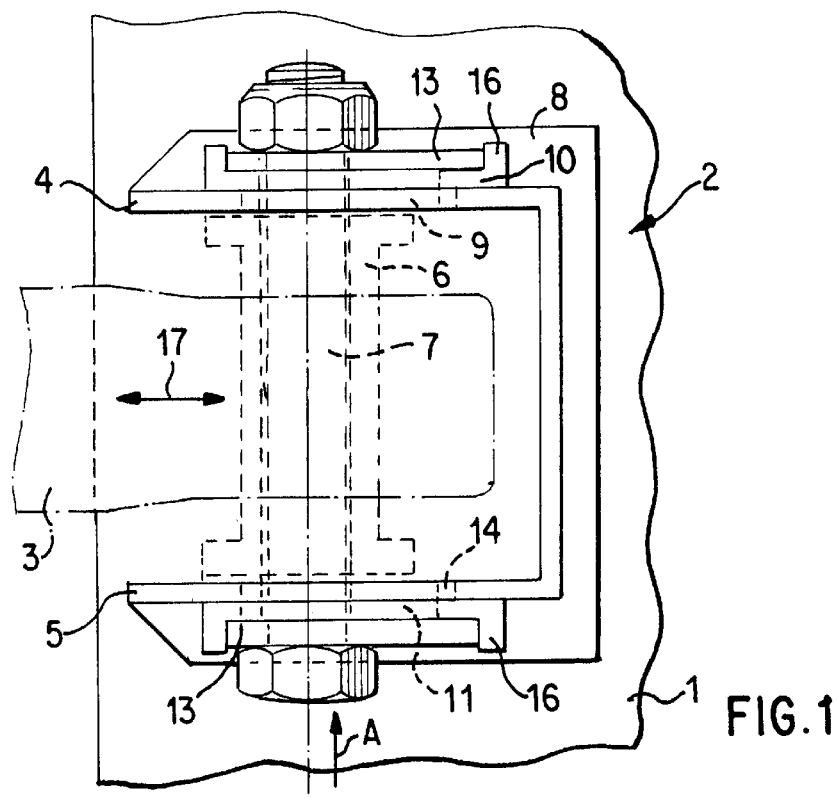
Figure 2:
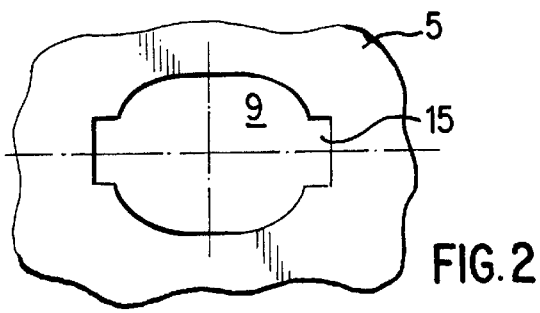
Figure 3:
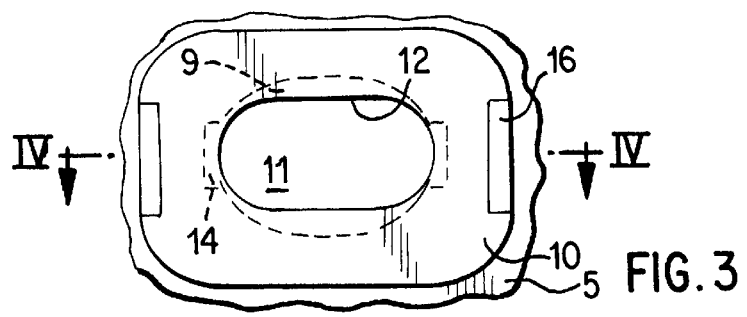
Figure 4:
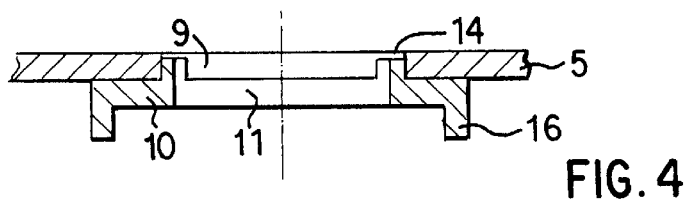
Figure 5:
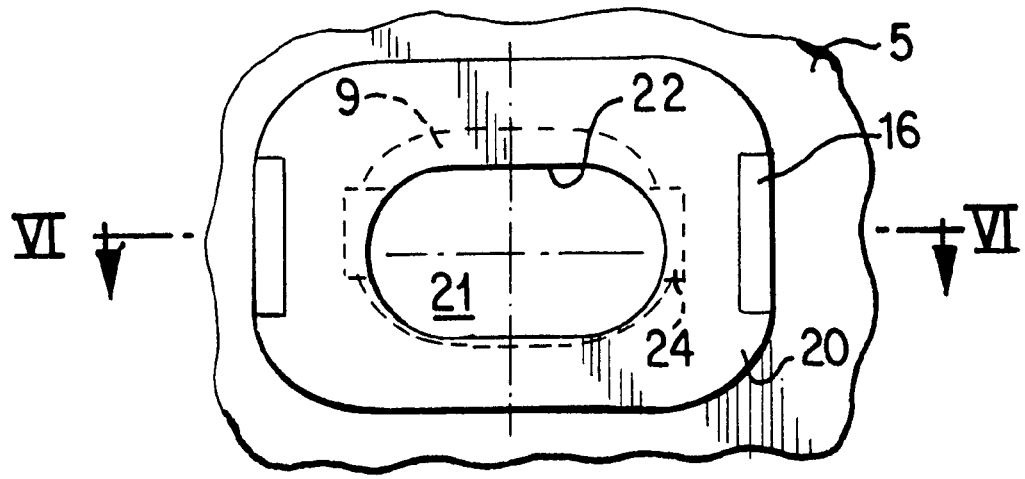
Figure 6:
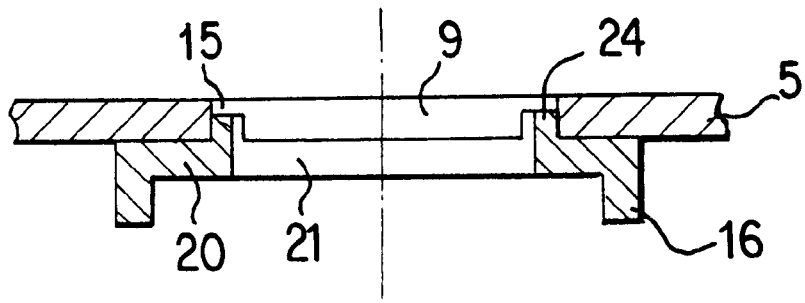

FIG. 1 is a schematic plan view of a bearing block provided in the mounting of a control arm, and the control arm;

FIG. 2 a partial views of a supporting arm of the bearing block of FIG. 1 with the opening provided therein for the kingbolt;

FIG. 3 a view similar to FIG. 2 but in which an adjusting disk for the kingbolt is placed on the supporting arm;

FIG. 4 is a sectional view along line IV—IV of FIG. 3;

FIG. 5 a view similar to FIG. 3 but with a different adjusting disk placed on the supporting arm; and FIG. 6 is a sectional view along line VI—VI of FIG. 5.

DETAILED DESCRIPTION OF THE DRAWINGS

In FIG. 1, a part of the body of a motor vehicle (not shown), is fastened on a bearing block 2 for a control arm 3. The body part can be, for example, a structural member of the vehicle or else also a subframe joined to the body, to which the control arms 3 are attached.

The bearing block 2 has an approximately U-shaped plan view, and has support arms 4, 5 which are at a distance apart and between which the bearing 6, usually an elastic bearing, for the control arm 3, is situated. The bearing 6 is supported by a kingbolt 7 on the support arms 4, 5. The bearing block is fastened on the body part 1 for example by welding or the like, which here is indicated by the flange 8.

The support arms 4, 5 have openings 9 for the kingbolt 7, the cross section of which is larger than the cross section of the kingbolt 7. The kingbolt openings 9 are covered by adjusting disks 10 which have slots 11 running transversely of the car body, which with their longitudinal edges 12 form guides for the kingbolt 7 and which are covered on the side facing away from the arms 4, 5 by eccentric disks 13. The adjusting disks 10 have on one side, i.e., on their flat side facing the support arms 4, 5 the projections 14 which in are engaged in the bolt opening 9, in the area of end recesses 15 opposite one another in the transverse direction of the vehicle. The adjusting disk 10, on its side opposite the projections 14, is provided on its margin with guiding abutments 16 which are configured as projections opposite one another in the direction of the length of the slot 11, against which the eccentric disk 13 thrusts.

In order to shift the linkage point of the control arm 3 transversely of the vehicle, the kingbolt 7 is shifted accordingly in the slot 11. This is done by rotating the kingbolt 7 by way of the eccentric disks that are co-rotational therewith, because the kingbolt 7 is supported perpendicular to the shift direction 17 by the longitudinal edges 12 of the slot 11. Thereby, rotation of the kingbolt 7 and of the eccentric disks 13 joined thereto results in a transverse shift of the kingbolt 7.

The above explanation of the present invention with the aid of FIGS. 1 to 4 relates to its basic configuration and to an embodiment of the adjusting disk 10 in which the projections 14 are disposed in symmetry with the longitudinal axis of the slot 11. Thereby, it is unimportant to the adjusting disk, as regards the position in which it is installed with respect to the support arms 4, which position the adjusting disk assumes when the projections 14 enter the recesses 15.

In the embodiment represented in FIGS. 5 and 6, an adjusting disk 20 is used which has basically the same construction, but in which the projections 24 are off-center from the longitudinal axis of the slot 21. Thus, if the recesses 15 of the kingbolt opening 9 are in the position and configuration of the recesses 15 of the kingbolt opening 9 shown in FIG. 2, in conjunction with an adjusting disk 20, the slot 21 and its longitudinal edges 22 will be at a different level than in the system in FIG. 3.

If the adjusting disk 20 of FIG. 5, is rotated over 180° about an axis perpendicular to the plane of the drawing, and is arranged in this position overlapping the kingbolt opening 9, the result will be a displacement of the slot 21 such that the slot axis will assume a position above the section plane VI—VI represented in FIG. 5. This displacement of the slot 11 as guide for the kingbolt 7 will also result in a vertical displacement of the kingbolt 7 and with it a shift of the linkage point of the control arm 3 on the body side, leading to a change in the tilt of the toe-in curve.

In the embodiments of both FIG. 3 and FIG. 5, the openings 15 and thus also the projections 14 and 24 are assumed symmetrical with the section planes IV—IV and VI—VI. It is within the scope of the present invention, however, to offset the recesses 15 vertically, either upward or downward, a solution making it possible to make the slot symmetrical with the plane of section or, as in FIG. 5, to offset it from the plane of section above the kingbolt opening 9. Thereby, one adjusting disk can achieve both the basic setting, here understood to be a slot 11 in a position symmetrical with the section plane, as well as a position at a level different therefrom.

The present invention can achieve at least three levels for the slot with two adjusting disks, so that with little expense the invention makes it possible to adjust both the toe-in and the tilt of the toe-in curve.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Device for setting toe-in motor vehicle wheels, comprising a bearing eye of a wheel suspension link lying between support arms on a body side, a kingbolt passing through the bearing eye and support arms for guiding the bearing eye with respect to the supporting arms and being adjustable vertically and horizontally for setting the toe-in established for a vehicle spring position corresponding to a selected position by adjusting disks guided on supporting surfaces of the support arms, wherein the adjusting disks are arranged to be fixed with respect to the supporting surfaces of the support arms in two positions spaced 180° apart, and the kingbolt with associated guides in the adjusting disks assume different elevations with respect to an approximately horizontal plane of reference containing an axis of rotation thereof.

2. Device according to claim 1, wherein the kingbolt, in the two positions of the adjusting disk rotated 180° from one another, lies offset on different sides of an approximately horizontal plane of reference containing the axis of rotation.

3. Device according to claim 1, wherein the adjusting disks have projections on the sides facing the support arms, which projections upon entering into the support arms are supported on the support surfaces formed by guiding edges.

4. Device according to claim 3, wherein the adjusting disks and the associated guides overlap bolt openings provided in the support arms, and the projections enter into the bolt opening containing the support surface.

5. Device according to claim 4, wherein the bolt openings have open-edged recesses as support surfaces for the projections.

6. Device according to claim 3, wherein recesses forming closed-edge support surfaces in the support arms are associated with the projections.

7. Device according to claim 1, wherein the guides provided in the adjusting disks are slots extending in a transverse direction of the vehicle.

8. Device according to claim 3, wherein the adjusting disks are provided on a side thereof opposite the projections with guiding abutments for eccentric adjusting disks through which the kingbolts pass.

9. Device according to claim 7, wherein the projections are off-center from a plane of symmetry containing a longitudinal axis of the slot.

10. Device according to claim 7, wherein the projections are disposed symmetrically with respect to a plane of symmetry containing a longitudinal axis of the slot.

* * * * *